United States Patent
Park

(10) Patent No.: US 9,292,176 B2
(45) Date of Patent: *Mar. 22, 2016

(54) APPARATUS AND METHOD FOR MANAGING MEDIA CONTENT

(71) Applicant: LG ELECTRONICS INC., Seoul (KR)

(72) Inventor: Dae Suk Park, Gumi-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,305

(22) Filed: Jul. 16, 2014

(65) Prior Publication Data
US 2015/0046819 A1    Feb. 12, 2015

Related U.S. Application Data

(63) Continuation of application No. 12/407,367, filed on Mar. 19, 2009, now Pat. No. 8,799,782.

(30) Foreign Application Priority Data

Sep. 30, 2008  (KR) .................. 10-2008-0096080

(51) Int. Cl.
```
G06F 3/00        (2006.01)
G06F 3/0482      (2013.01)
H04N 21/431      (2011.01)
H04N 21/433      (2011.01)
H04N 21/482      (2011.01)
H04N 21/81       (2011.01)
G06F 3/0484      (2013.01)
```

(52) U.S. Cl.
CPC .......... *G06F 3/0482* (2013.01); *G06F 3/04842* (2013.01); *H04N 21/4312* (2013.01); *H04N 21/4314* (2013.01); *H04N 21/4334* (2013.01); *H04N 21/4828* (2013.01); *H04N 21/8153* (2013.01)

(58) Field of Classification Search
CPC .................................. H04N 21/4312
USPC .......................................... 715/719
See application file for complete search history.

(56) References Cited

U.S. PATENT DOCUMENTS

| | | | |
|---|---|---|---|
| 6,166,735 A | 12/2000 | Dom et al. | 715/749 |
| 6,828,993 B1 | 12/2004 | Hendricks et al. | 715/819 |
| 7,437,681 B2 | 10/2008 | Misawa et al. | 715/835 |

(Continued)

FOREIGN PATENT DOCUMENTS

| | | |
|---|---|---|
| EP | 1 096 793 A2 | 5/2001 |
| EP | 1 544 861 A1 | 6/2005 |

(Continued)

OTHER PUBLICATIONS

U.S. Appl. No. 12/407,367, filed Mar. 2009, Park, Dae Suk.

(Continued)

*Primary Examiner* — William Titcomb
(74) *Attorney, Agent, or Firm* — KED & Associates LLP

(57) ABSTRACT

A method for managing media content includes storing a program received from a tuner in a storage device, outputting a plurality of first thumbnail images from the program to a display screen, extracting one or more second thumbnail images in a section of the program between a selected first thumbnail image and another first thumbnail image, and outputting the second thumbnail images to the display screen.

15 Claims, 5 Drawing Sheets

(56) References Cited

U.S. PATENT DOCUMENTS

| | | | |
|---|---|---|---|
| 7,644,373 B2 | 1/2010 | Jing et al. ................... 715/838 |
| 7,716,605 B2 | 5/2010 | Oh ............................. 715/838 |
| 7,843,454 B1 | 11/2010 | Biswas ....................... 345/473 |
| 7,853,898 B2 | 12/2010 | Clark et al. ................. 715/840 |
| 7,954,065 B2 | 5/2011 | Ubillos ....................... 715/793 |
| 7,984,385 B2 | 7/2011 | Ubillos ....................... 715/793 |
| 7,992,097 B2 | 8/2011 | Ubillos ....................... 715/793 |
| 8,020,100 B2 | 9/2011 | Ubillos et al. .............. 715/723 |
| 8,059,161 B2 * | 11/2011 | Hirabayashi ......... G11B 27/034 348/222.1 |
| 8,255,815 B2 * | 8/2012 | Ording ............... G06F 3/04817 715/764 |
| 8,261,191 B2 * | 9/2012 | Ording ............... G06F 3/04817 715/716 |
| 8,364,731 B2 | 1/2013 | Hirata ......................... 707/829 |
| 8,375,318 B2 | 2/2013 | Masuda et al. .............. 715/772 |
| 8,473,846 B2 | 6/2013 | Ubillos et al. .............. 715/723 |
| 8,522,144 B2 * | 8/2013 | Lyons .................... G06F 3/048 715/720 |
| 8,782,523 B2 * | 7/2014 | Tokunaka ............ G11B 27/034 715/719 |
| 8,799,782 B2 * | 8/2014 | Park ................... H04N 21/4312 715/721 |
| 8,850,481 B2 * | 9/2014 | Shannon ............. H04N 5/44543 725/46 |
| 8,887,184 B2 * | 11/2014 | Klappert ............. H04N 5/44543 725/10 |
| 8,984,561 B2 * | 3/2015 | Lee .................... H04N 21/234 715/716 |
| 9,043,729 B2 * | 5/2015 | Chaudhri .............. G06F 3/0482 715/834 |
| 9,055,322 B2 * | 6/2015 | Ellis .................... G11B 27/005 |
| 9,087,126 B2 * | 7/2015 | Haberman ........ G06F 17/30817 |
| 9,094,640 B2 * | 7/2015 | Kim ........................ H04N 5/445 |
| 9,094,709 B2 * | 7/2015 | Jeong ................ H04N 21/4312 |
| 2002/0065741 A1 | 5/2002 | Baum ........................... 705/26 |
| 2005/0071773 A1 | 3/2005 | Ivanovic et al. ............. 715/768 |
| 2006/0080342 A1 | 4/2006 | Takaki ......................... 707/100 |
| 2007/0083911 A1 | 4/2007 | Madden et al. ............. 725/135 |
| 2007/0206923 A1 | 9/2007 | Murakoshi et al. ............ 386/95 |
| 2007/0209025 A1 | 9/2007 | Jing et al. ..................... 715/968 |
| 2007/0220045 A1 | 9/2007 | Morris et al. .............. 707/104.1 |
| 2008/0022230 A1 | 1/2008 | Ogawa et al. ................ 715/838 |
| 2008/0034325 A1 | 2/2008 | Ording ......................... 715/838 |
| 2008/0129728 A1 | 6/2008 | Satoshi ........................ 715/716 |
| 2008/0134096 A1 | 6/2008 | Satoshi ........................ 715/838 |
| 2008/0155413 A1 | 6/2008 | Ubillos ........................ 345/419 |
| 2008/0155420 A1 | 6/2008 | Ubillos et al. ............... 715/723 |
| 2008/0155421 A1 | 6/2008 | Ubillos et al. ............... 715/724 |
| 2008/0155459 A1 | 6/2008 | Ubillos ........................ 715/783 |
| 2008/0288869 A1 | 11/2008 | Ubillos ........................ 715/716 |
| 2009/0106700 A1 | 4/2009 | Nobori et al. ................ 715/838 |
| 2010/0166393 A1 * | 7/2010 | Park ........................ H04N 5/76 386/241 |
| 2010/0192106 A1 | 7/2010 | Watanabe et al. ............ 715/838 |
| 2015/0020109 A1 * | 1/2015 | Higa .................. H04N 21/4312 725/47 |
| 2015/0143395 A1 * | 5/2015 | Reisman ........... G06F 17/30873 725/14 |

FOREIGN PATENT DOCUMENTS

| | | |
|---|---|---|
| JP | 2007-089012 | 4/2007 |
| JP | 2007-096840 | 4/2007 |

OTHER PUBLICATIONS

European Search Report dated Dec. 3, 2009.
Office Action dated May 26, 2011, issued in U.S. Appl. No. 12/407,367.
Final Office Action dated Dec. 8, 2011, issued in U.S. Appl. No. 12/407,367.
European Search Report dated Feb. 14, 2012.
Office Action dated Aug. 23, 2012, issued in U.S. Appl. No. 12/407,367.
Final Office Action dated Mar. 21, 2013, issued in U.S. Appl. No. 12/407,367.
Office Action dated Dec. 18, 2013, issued in U.S. Appl. No. 12/407,367.
Notice of Allowance dated Jul. 16, 2014, issued in U.S. Appl. No. 12/407,367.

* cited by examiner

APPARATUS AND METHOD FOR MANAGING MEDIA CONTENT

CROSS REFERENCE TO RELATED APPLICATIONS

This application is a Continuation Application of prior U.S. patent application Ser. No. 12/407,367 filed Mar. 19, 2009, which claims priority to Korean Patent Application No. 10-2008-0096080, filed Sep. 30, 2008, whose entire disclosures are hereby incorporated by reference.

BACKGROUND

1. Field

One or more embodiments described herein relate to managing media.

2. Background

Broadcast receivers which record and store programs have become popular. Receivers that store large numbers of programs are equipped with a search function. In some receivers, the search function is implemented using a progress bar that provides an indication of a progressive status of the programs. In these or other receivers, a time-shift function may also be used to assist users in searching for stored programs. However, related-art techniques for searching programs have proven inadequate.

DETAILED DESCRIPTION

Figure 1:
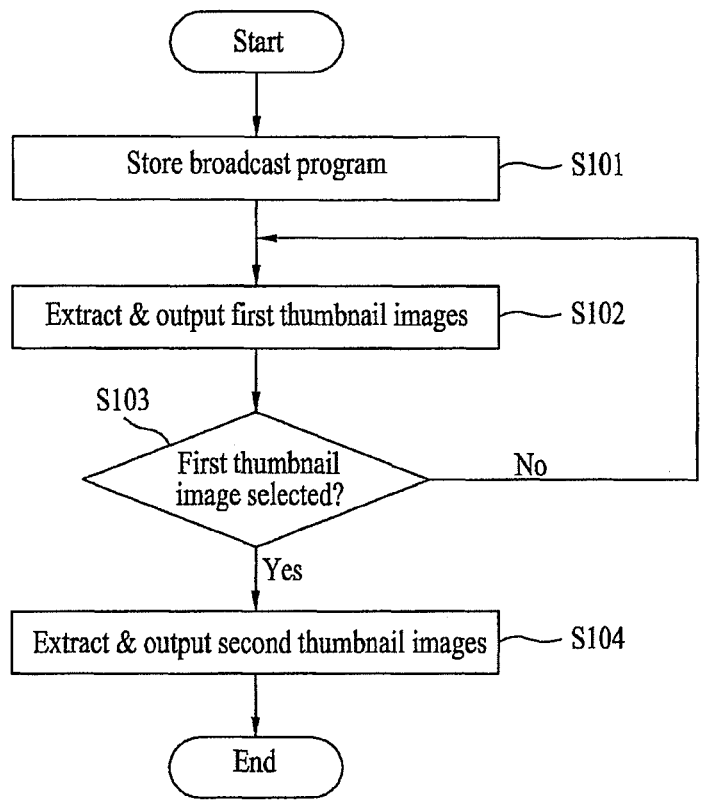
FIG. 1 is a diagram showing one embodiment of a method for controlling the operation of a media receiver.

FIG. 1 shows one embodiment of a method for controlling the operation of a receiver that stores media content including but not limited to programs obtained from a media transmission source. In one application, the programs are broadcast programs received by a tuner included within or coupled to the receiver. In another application, the programs may be obtained from a cable or satellite source. For the sake of discussion, the media content will generally be referred to as a program with the understanding that all types of programs are being referred to.

In an initial step, a program is received by the tuner and stored in a predetermined storage device located within or coupled to the receiver (S101). The receiver may store the program in the storage device in a delayed manner based on a prescribed period of time and in response to a time-shift command. The storage device may be an internal or external hard-disk drive (HDD) or any other device capable of storing programs and other types of data.

In a second step, the receiver sequentially extracts one or more first thumbnail images from the program and outputs the extracted first thumbnail images to a display screen of a panel (S102). The receiver may perform this function by reading the program from the storage device and then generating the first thumbnail images by extracting images from the program based on a prescribed time interval.

Alternatively, the first thumbnail images may be extracted as the program is being received by the tuner, i.e., as the program is received and first stored in the storage device. The first thumbnail images may be generated in various sizes according to a particular application or preference of the receiver manufacturer or user.

Figure 2:
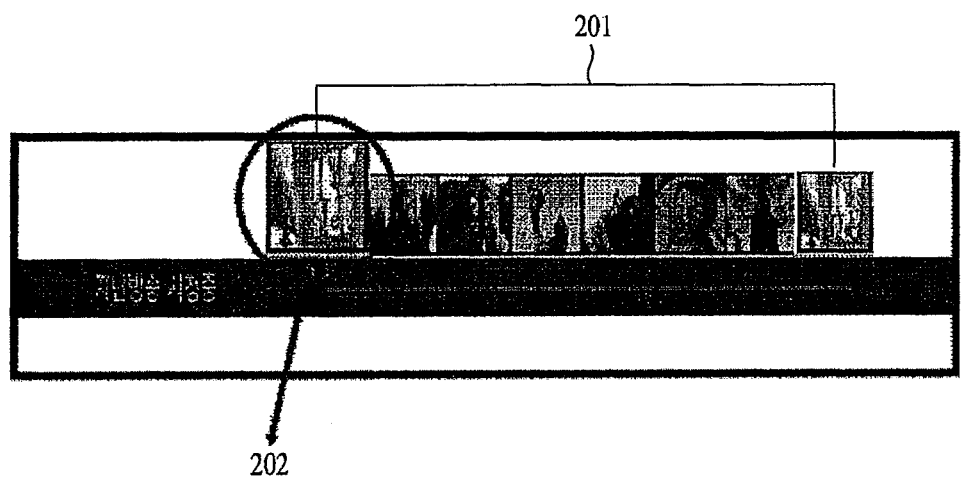
FIG. 2 is a diagram showing an example of how a first thumbnail image may be extracted and displayed in accordance with one or more embodiments.

FIG. 2 shows an example of how a first thumbnail image may be extracted and output for viewing. As mentioned, the receiver may extract one or more first thumbnail images from a program based on a prescribed time interval and then output the extracted images together with a progress bar.

According to one application, a user may select one of a plurality of first thumbnail images 201 using an input device and the receiver will output the selected image 202 in an enlarged format. In performing this operation, the receiver may obtain information indicating a time at which the user-selected first thumbnail image was extracted in one or more sections of the program. The selected image will then be output by shifting a progressive position of the progressive bar to the time at which the first thumbnail image was extracted.

Returning to FIG. 1, when one of the first thumbnail images is selected by the user (S103), the receiver will perform an operation that includes extracting one or more second thumbnail images in a section between the selected first thumbnail image and another first thumbnail image. The other first thumbnail image may be one next to or adjacent the selected first thumbnail image or may be another one of the first thumbnail images. The extracted second thumbnail images will then be output for displayed (S104).

Figure 3:
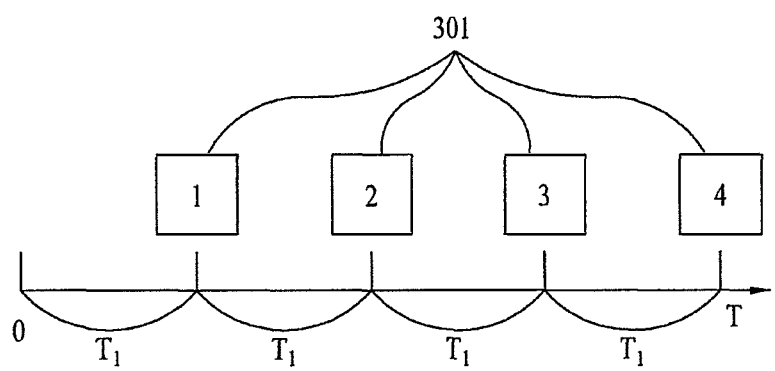
FIG. 3 is a diagram showing how first and second thumbnail images may be extracted in accordance with one or more embodiments.
Figure 3:
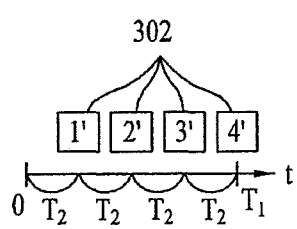

FIG. 3 shows one way in which one or more first thumbnail images may be extracted and then how one or more second thumbnail images may be extracted according to the aforementioned method. The receiver may extract a set of first thumbnail images 301 based on a common interval T1 in whole or different sections of the program stored in the storage device.

When a user selects one of the first thumbnail images, the receiver extracts one or more second thumbnail images 302 in a section located between the selected first thumbnail image and a succeeding or preceding first thumbnail image. In one application, the receiver may extract a predetermined number of second thumbnail images located between the selected first thumbnail image and the first thumbnail image next to (or adjacent) the selected first thumbnail image. For example, if the user selects first thumbnail image #1, the receiver may extract second thumbnail images 1', 2', 3' and 4' between the first thumbnail #1 and first thumbnail #2. The second thumbnail images may be spaced by a common internal T2.

Figure 4:
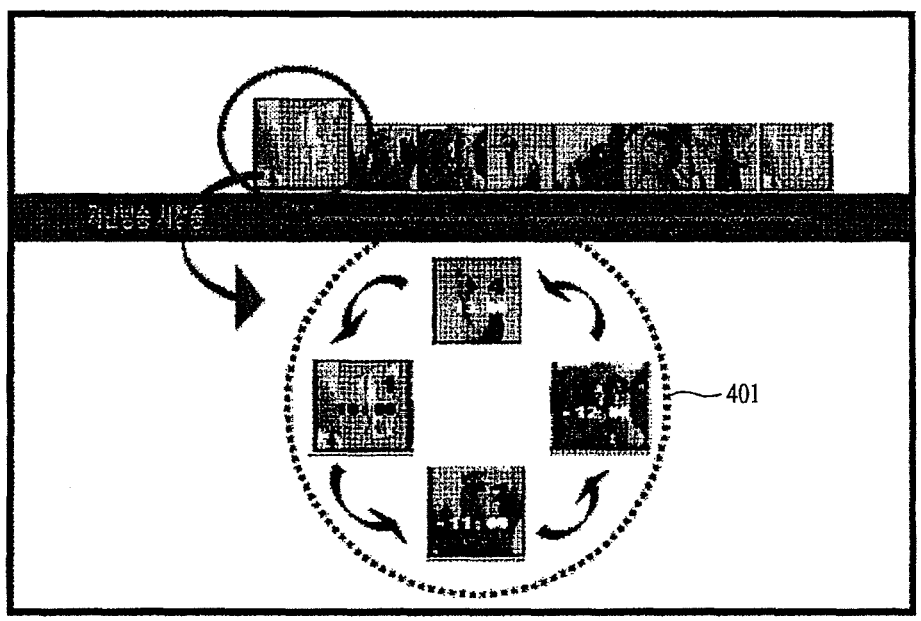
FIG. 4 is a diagram showing an example of how second thumbnail images may be rolled and stored according to one or more embodiments.

FIG. 4 shows an example of how the extracted second thumbnail images may be output for display. In this example, the extracted second thumbnail images are output in a rolling format. That is, the receiver may output the extracted second thumbnail images 1', 2', 3' and 4' in FIG. 3 by rolling them in a format shown by dotted circle 401.

The rolling arrangement of second thumbnail images may include direction arrows, keys, cursors or other graphics that allow a user to control the presentation the second images. A user, for example, may select a direction key with a user input device to cause the position or orientation of the second thumbnail images to be changed in correspondence with the selected direction key.

Optionally, the receiver may output the second thumbnail images by switching the order of the second thumbnail images, by a fade-out scheme, or by overlapping the second thumbnail images. The receiver may also output the second thumbnail images to a separate user interface.

According to another option, the receiver may output the user-selected first thumbnail images by switching one or more of the user-selected first thumbnail image to one or more of the second thumbnail images, by switching one or more of the user-selected first thumbnail images using a fade-out scheme, or by switching an overlapping arrangement of the user-selected first thumbnail images.

Figure 5:
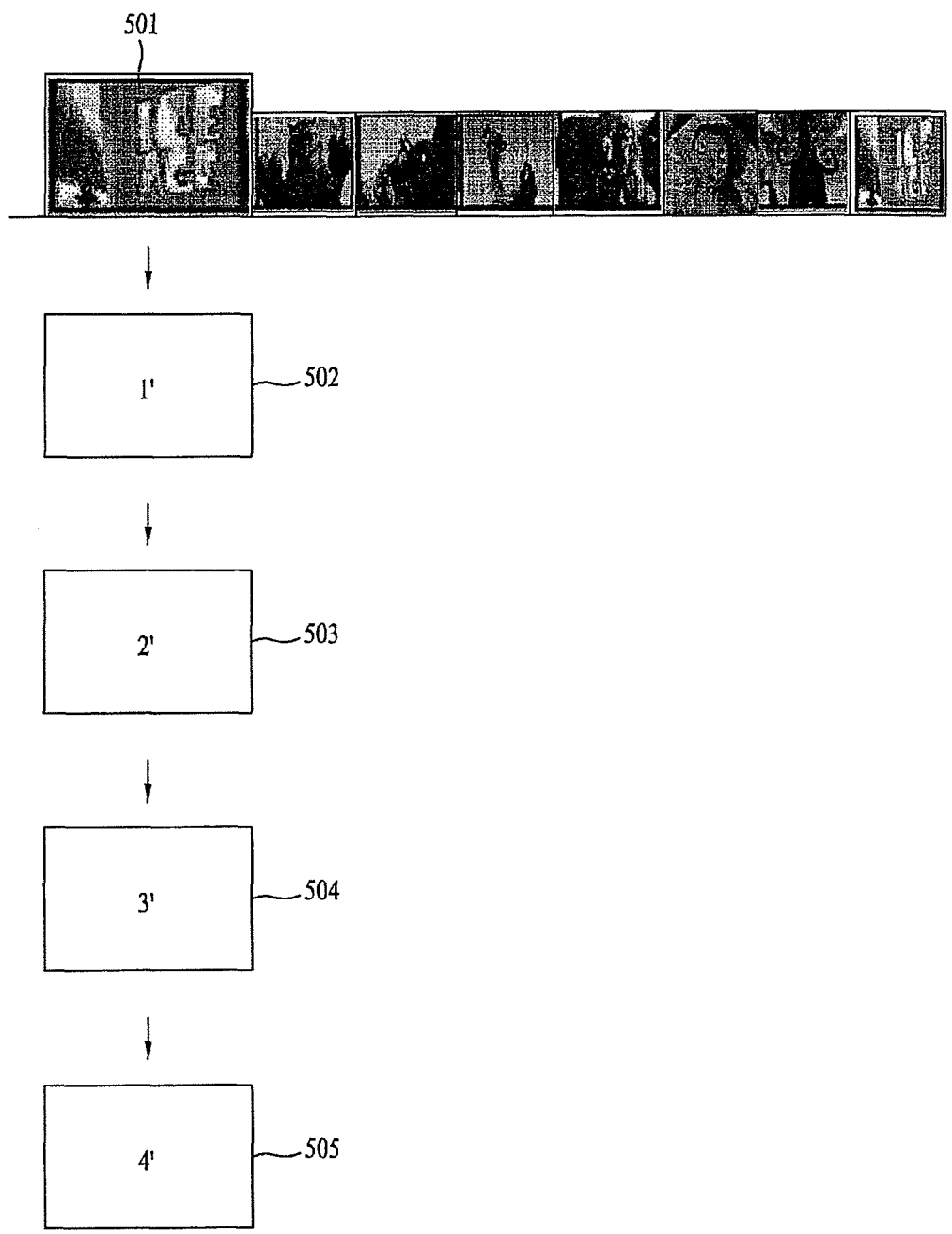
FIG. 5 is a diagram showing an example of how a second thumbnail image may be output by switching a first thumbnail image to the second thumbnail image according to one or more embodiments.

FIG. 5 shows an example of how a second thumbnail image may be output for display by a scheme that involves switching a first thumbnail image to the second thumbnail image. According to this scheme, the receiver may sequentially switch a user-selected first thumbnail image 501, from a plurality of first thumbnail images, to the extracted second thumbnail images respectively. For instance, the receiver is able to sequentially switch to or replace the first thumbnail image 501 with second thumbnail images 1' (502), 2' (503), 3' (504) and 4' (505) respectively.

The second thumbnail images may be displayed in the same location or window as the selected first image or may be displayed below the selected first image. Furthermore, the second thumbnail images may be automatically displayed at this location sequentially or the images may be switched in response to, for example, a user signal. Moreover, the second thumbnail images may be rotated into the position corresponding to the selected first thumbnail image.

According to one embodiment, the receiver may provide a number indicating the sequence used to extract the second thumbnail images. The second thumbnail images may then be output with information representing the extraction sequence on corresponding ones of the second thumbnail image. For instance, second thumbnail images 1', 2', 3' and 4' may output with sequence numbers 1, 2, 3 and 4, respectively, located thereon or relative thereto.

According to another embodiment, the receiver may output each second thumbnail image with time-shift time information thereon or relative thereto. One example of the type of time-shift information that may be included with the second thumbnail images is shown in FIG. 2, which in this case shows such information in relation to a highlighted first thumbnail image. According to another example, each of the second thumbnail images 1', 2', 3' and 4' may be output with information indicating a time-shifted time from an original time (e.g., an original broadcast time); that is, 00:10, 00:20, 00:30 and 00:40 may be represented.

According to another embodiment, the second thumbnail images may be output with time information (e.g., broadcast time information) on the images or at positions relative to those images. For instance, second thumbnail images 1', 2', 3' and 4' may be output with original broadcast time information 10:00, 11:00, 12:00 and 13:00.

According to another embodiment, when a user selects a second thumbnail image, the receiver may play and output a section of the program corresponding to the selected second thumbnail image.

One or more of the foregoing embodiments therefore extract and output for display a second thumbnail image located between two first thumbnail images. Through this process, the user can determine what kind of content exists between a selected first thumbnail image and another thumbnail image. This, in turn, provides for an improved way of searching for content of one or more programs stored for a receiver.

Moreover, the first thumbnail images may be extracted from a program with a predetermined time interval, thereby enhancing user's convenience. To further enhance the user's convenience, one or more second thumbnail images between the selected first thumbnail image and another first thumbnail image may be displayed in various ways. This will enable a user to more effectively understand the content of a recorded program during, for example, a search operation.

Figure 6:
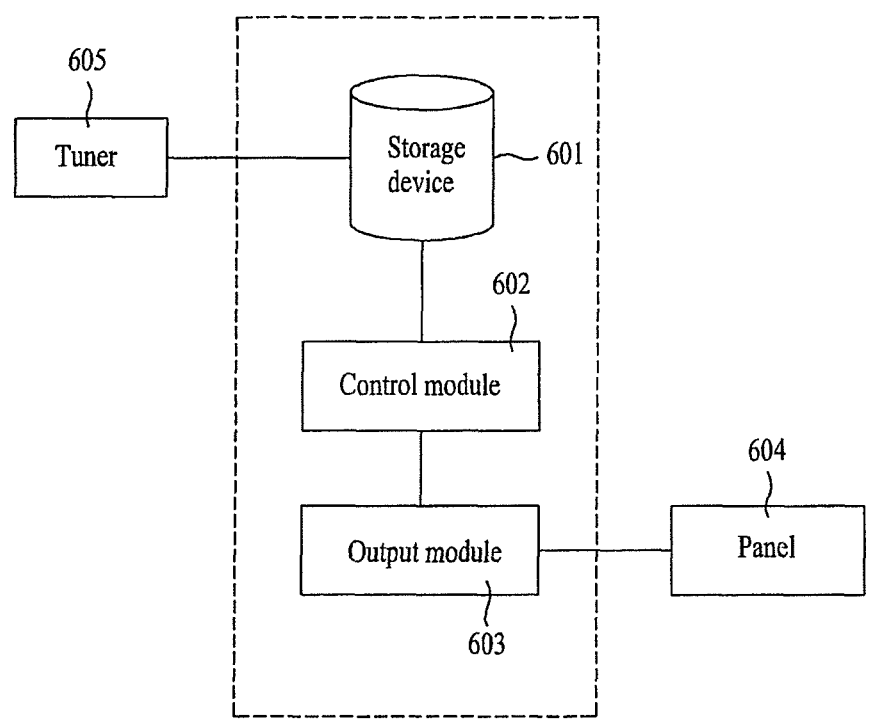
FIG. 6 is a diagram showing one embodiment of a receiver capable of implementing the embodiments of the methods shown in FIGS. 1-5.

FIG. 6 shows one type of a receiver that may be used to implement the methods previously described. This receiver includes a storage device 601, a control module 602, and an output module 603. The storage device may be an EEPROM, hard disk drive (HDD), flash memory or any other device capable of storing data.

The storage device stores programs received by tuner 605.

The control module 602 sequentially extracts first thumbnail images from a program and then outputs the extracted first thumbnail images to a display screen, e.g., monitor, panel, or television 604. If one of the first thumbnail images is selected, the control module extracts one or more second thumbnail images in a section between the selected first thumbnail image and another first thumbnail image (e.g., a first image next to the selected first image) from the stored program.

The output module 603 outputs one or more of the second thumbnail images for display. The output module may also switch the order of the second thumbnail images for or when displayed, switch the second thumbnail images based on a fade-out scheme, or switch the second thumbnail images using an overlapping scheme. Optionally, the output module may switch the selected first thumbnail image to one or more of the second thumbnail images based on order, a fade-out scheme, or an overlapping scheme.

As a further option, the output module may output the extracted second thumbnail images by rolling the extracted second thumbnail images. And, if a user selects a direction key of or using an input device, the output module may change the position of the second thumbnail images to a position indicated by the selected direction key.

As a further option, the output module may number the extracted second thumbnail images in sequence and then output the second thumbnail images by representing sequence information on each of the second thumbnail images.

As a further option, the output module may output the second thumbnail images by representing time-shift time information on each second thumbnail image, or by representing time information (e.g., broadcast time information) on each of the second thumbnail images.

As a further option, if a user selects one of the first or second thumbnail images, control module 602 may play a section of the program that corresponds to the first or second thumbnail image that was selected.

Thus, in accordance with the foregoing embodiments, a method of operating a receiver, which records a program (e.g., a broadcast program) includes the steps of storing the program received by a prescribed tuner in a storage means, outputting first thumbnail images sequentially extracted from the program to a display screen, if one of the first thumbnail images is selected, extracting at least one or more second thumbnail images in a section between the selected first image and the first thumbnail image next to the selected thumbnail image from the stored program, and outputting the extracted at least one or more second thumbnail images.

In accordance with another embodiment, a receiver for recording a broadcast program includes a storage means to store the broadcast program received by a prescribed tuner, a control module to sequentially extract first thumbnail images from the broadcast program, output the extracted first thumbnail images to a display screen, to extract at least one or more second thumbnail images in a section between a selected first thumbnail image and a first thumbnail image next to the selected thumbnail image from the stored broadcast program if one of the first thumbnail images is selected, and an output module to output the extracted at least one or more second thumbnail images.

The foregoing embodiments may therefore be implemented to achieve one or more of the following effects or advantages.

First, one or more second-level thumbnail images may be extracted between two first-level thumbnail images, which, for example, may be adjacent first-level images. This technique provides the user with information concerning the kind of content that exists between the first-level thumbnail images. Also, the first-level images may be extracted from a broadcast program a predetermined time interval, thereby enhancing user's convenience. The time interval between second-level images may be the same or different, the time interval between the first-level images may also be the same or different.

Second, one or more second-level thumbnail images located between first thumbnail image sections may be output for display in various ways, thereby enabling a user to determine the content of the program more accurately.

Any reference to "one embodiment," "an embodiment," "example embodiment," etc., means that a feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A display device for reproducing thumbnail images of video content, comprising:
a non-transitory storage unit configured to store video content;
a display screen for displaying a plurality of first thumbnail images, the thumbnail images being based on the video content, the plurality of first thumbnail images being displayed in a sequential order; and
a controlling unit configured to control a display of a plurality of second thumbnail images on the display screen in response to selecting one of the first thumbnail images,
wherein displaying of the plurality of second thumbnail images correspond to a section of the video content between the selected first thumbnail image and another one the first thumbnail images adjacent to the selected first thumbnail image of the plurality of first thumbnail images,
wherein a progressive bar is displayed along with the displayed plurality of first thumbnail images in order to indicate a progress of the video content,
wherein the selected first thumbnail image and the plurality of second thumbnail images are displayed together on the display screen of the display device.

2. The display device of claim 1, wherein each of the second thumbnail images are different from each of the plurality of first thumbnail images.

3. The display device of claim 1, the controlling unit further comprising receiving a selection of a graphic on the display device to cause position or orientation of the plurality of second thumbnail images to change based on the selected graphic.

4. The display device of claim 3, wherein the graphic is a directional arrow.

5. The display device of claim 4, wherein the directional arrow is input by a user and the plurality of second thumbnail images are displayed in a location of the display screen corresponding to the user inputted directional arrow.

6. The display device of claim 5, wherein the user input is inputted via a remote controller.

7. The display device of claim 6, wherein the selected one of the first thumbnail images corresponds to the indicator indicating the progressive position of the progressive bar.

8. The display device of claim 6, wherein the selected one of the first thumbnail images is larger than other ones of the plurality of first thumbnail images.

9. The display device of claim 1, wherein the selected one of the first thumbnail images is selected by shifting an indicator indicating a progressive position of the progressive bar to a time at which the first thumbnail image was extracted.

10. The display device of claim 1, wherein the controlling unit is further configured to display the plurality of second thumbnail images according to a second time interval.

11. The display device of claim 10, wherein time information is displayed along with the plurality of second thumbnail images.

12. The display device of claim 1, wherein the stored video content is a broadcast program received through a tuner.

13. The display device of claim 12, wherein the stored video content corresponds to a time shift function stored according to a time shifted time from an original time.

14. The display device of claim 1, wherein the controlling unit is further configured to display the plurality of first thumbnail images according to a first time interval.

15. The display device of claim 1, wherein when a user selects one of the second thumbnail images, the controlling unit is further configured to display, on the display screen, the video content from a point starting with the selected one of the second thumbnail images.

* * * * *